United States Patent [19]

Moser

[11] Patent Number: 4,577,509

[45] Date of Patent: Mar. 25, 1986

[54] ARRANGEMENT FOR DETERMINING THE TRAVEL OF A PISTON

[75] Inventor: Bernd Moser, Wissen, Fed. Rep. of Germany

[73] Assignee: Boge GmbH, Eitorf, Fed. Rep. of Germany

[21] Appl. No.: 621,075

[22] Filed: Jun. 15, 1984

[30] Foreign Application Priority Data

Jun. 15, 1983 [DE] Fed. Rep. of Germany ....... 3321510
Aug. 30, 1983 [DE] Fed. Rep. of Germany ....... 3331170

[51] Int. Cl.⁴ ............................................. G01R 27/26
[52] U.S. Cl. ..................................... 73/658; 324/61 R; 324/59; 324/71.1; 324/207
[58] Field of Search ............................ 73/658, 11, 118; 324/61 R, 59, 71.1, 207

[56] References Cited

U.S. PATENT DOCUMENTS

| | | | |
|---|---|---|---|
| 2,978,638 | 4/1961 | Wing et al. | 324/61 R |
| 3,697,867 | 10/1972 | Kleesattel | 73/658 |
| 3,805,150 | 4/1974 | Abbe | 324/61 R |
| 4,206,401 | 6/1980 | Meyer | 324/61 R |

FOREIGN PATENT DOCUMENTS

| | | |
|---|---|---|
| 1248959 | 8/1967 | Fed. Rep. of Germany . |
| 1299432 | 7/1969 | Fed. Rep. of Germany . |
| 1933640 | 1/1970 | Fed. Rep. of Germany . |
| 3212433 | 4/1983 | Fed. Rep. of Germany . |
| 3244891 | 6/1984 | Fed. Rep. of Germany . |
| 136069 | 6/1979 | German Democratic Rep. . |
| 2106651 | 4/1983 | United Kingdom . |

Primary Examiner—Anthony V. Ciarlante
Attorney, Agent, or Firm—Nils H. Ljungman

[57] ABSTRACT

A contactlessly, measuring arrangement for determining the position of a piston in a suspension component such as a vibration damper, gas spring or hydro-pneumatic suspension. In one embodiment, the piston and/or the piston rod of the suspension component and a further electrode are mounted inside the cylinder of the suspension component to form a variable capacitor which, with the aid of other circuitry, measures the position of the piston. The further electrode preferably is in the form of a tube extending from the base of the cylinder into a hollow cylinder formed within the piston rod which receives the tube. In the capacitive embodiment, additionally, there may be provided a further tube within the first tube to form a reference, second capacitor which is sensitive to pressure and temperature in the same manner as the first capacitor. The first capacitor serves as the variable capacitor for making a position measurement of the piston and the two tubes fixed relative to one another are employed to form the reference capacitor. In an alternative embodiment, the outer surface of the cylinder has an inductive coil wound therearound for producing a magnetic field which is variable dependent upon the position of the piston within the cylinder. Both measuring arrangements when connected in a Wheatstone Bridge circuit produce an electrical signal indicative of the position of the piston.

20 Claims, 10 Drawing Figures

ARRANGEMENT FOR DETERMINING THE TRAVEL OF A PISTON

BACKGROUND OF THE INVENTION

1. FIELD OF THE INVENTION

The invention relates generally to an arrangement for determining the position or travel of a piston in hydraulic, pneumatic or hydro-pneumatic assemblies, such as vibration dampers, gas springs and hydro-pneumatic suspensions, and more particularly, to vibration dampers having the piston arranged to slide axially by means of a piston rod in a cylinder filled with at least one damping medium.

2. DESCRIPTION OF PRIOR ART

Suspensions are, for example, known from British Laid-Open Patent Application No. 8110972 and its corresponding German Laid-Open Patent Application DE-OS 32 12 433 in which each suspension unit of a vehicle has a sensor for adjusting its platform height producing an output magnitude which changes progressively with the platform height. The drawback here is that for adjusting the height of the platform, i.e. the spacing between the sprung and unsprung parts of the vehicle, a platform height sensor is provided at each respective suspension unit. Such a device is particularly expensive as the corresponding measured values between the vehicle suspension and the actual suspension unit or strut must be ascertained. Further, this determination of the measured value is expensive as corresponding measurement transducers must be provided on the widely different parts of the vehicle.

3. OBJECTS OF THE INVENTION

Taking the above as a starting point, it is the object of the invention to provide a method of measuring the piston travel, the apparatus of which operates without physical contact between the parts of the transducer thereby providing with a high degree of reliability. It is a further object of the invention to integrate the measuring arrangement into the suspension of a vehicle, which arrangement has relatively small dimensions with respect to its incorporating unit and thereby requires no major modifications to existing hydraulic, pneumatic or hydro-pneumatic assemblies such as vibration dampers, gas springs and hydropneumatic suspensions.

SUMMARY OF THE INVENTION

One aspect of the invention resides broadly in a cylinder having an arrangement for determining a position of piston means therewithin, said cylinder having a space therewithin with said piston means disposed in said space for axial slidable movement within said cylinder; at least one damping medium being disposed within said cylinder for damping said axial movement of said piston means with respect to said cylinder; said arrangement for determining the position of said piston means comprising: means for sensing a position of said piston means within said cylinder; said position sensing means having a first element and a second element; said first element of said position sensing means being disposed to be movable with said piston means; said second element of said position sensing means being disposed to be substantially stationary with respect to said cylinder; said first element and said second element being electrically insulated one from the other; said two elements forming a variable impedance component which is substantially electrically reactive; and wherein said variable reactive electrical impedance varies, in operation, with said position of said piston means in said cylinder; an electrical signal generated by at least one of said elements and being indicative of said position of said piston means; and electrical connecting means, connected to at least one of said elements, for sensing said electrical signal, indicative of said position of said piston means.

Another aspect of the invention resides broadly in a cylinder having an arrangement for determining a position of piston means therewithin, said cylinder having a space therewithin with said piston means disposed in said space for axial slidable movement within said cylinder; at least one damping medium being disposed within said cylinder for damping said axial movement of said piston means with respect to said cylinder; one of said at least one damping medium being hydraulic damping oil; said arrangement for determining the position of said piston means comprising: said piston means including a circular, hollow piston rod; said cylinder having a base at one end thereof from which a hollow circular cylindrical, first tube extends into said space and also into said hollow piston in a telescopic relationship therewith, thereby forming, with a dielectric material, comprising said hydraulic damping oil, disposed between said first tube and said piston rod, a variable, first capacitor; a longitudinal axis of said piston rod being substantially aligned with a longitudinal axis of said first tube; said first tube being insulated from said cylinder and said hollow piston rod; a first lead connected to said first tube; and a second lead connected to said hollow piston rod.

Yet another aspect of the invention resides broadly in a cylinder having an arrangement for determining a position of piston means therewithin, said cylinder having a space therewithin with said piston means disposed in said space for axial slidable movement within said cylinder; at least one damping medium being disposed within said cylinder for damping said axial movement of said piston means with respect to said cylinder; said arrangement for determining the position of said piston means comprising: said piston means comprising a magnetic material; inductive means comprising at least one induction coil disposed about said cylinder, so that, movement of said piston means varies at least one inductance of said inductive means; and electrical connecting means being electrically connected to said inductive means.

The problems related to the prior art are solved, according to one embodiment of the invention, by providing a capacitor which is formed in the interior of the cylinder in such a way that a first axially displaceable electrode is formed directly or indirectly by the piston and/or the piston rod and a second electrode, insulated from the first, is held fixed within the cylinder. These first and second electrodes are separated from one another by a dielectric.

In this first embodiment, it is preferable that a compact measuring system assembly is provided by a physical contactlessly workable method of measurement, so that the measuring system can be integrated into, for example, a vibration damper, a gas spring or a hydropneumatic suspension without major modifications. Further advantages of this embodiment of the invention are the low-cost of manufacture and the providing of vehicle suspension which can readily function together with the arrangement for determining the travel or position of a piston therein, as a self-contained unitary system.

According to a further important feature of the invention, it is provided that the piston rod is made hollow, thereby forming the first electrode. A second electrode comprising a tube, is provided and disposed within the hollow space in the piston rod and spaced therefrom. This tube is secured in the base of the cylinder and is insulated from the first electrode and also preferably from the cylinder. The second electrode is disposed substantially coaxially with the first electrode and at least partially therewithin. The first electrode is axially displaceable in a telescopical fashion relative to the second electrode.

It has been found particularly desirable to design and make a hydro-pneumatic vibration damper so that a cylindrical capacitor can be provided therein with minimal structural modifications. The typically oil-filled vibrational damper cylinder and its often hollow piston rod have associated therewith an additional hollow cylinder which is held by an insulating body in the base of the vibration damper cylinder. The hollow piston rod and the additional cylinder form a cylindrical capacitor which, as a result of the varying overlapping surfaces, form a first and second electrode, which arrangement produces a variation in capacitance so that the desired value of a physical magnitude to be measured is provided by a change in the capacitance between the electrodes.

The travel of the piston results in the change of capacitance as a function of the piston displacement. The position of the piston is uniquely related to the capacitance. The capacitance of the cylindrical capacitor as a function of piston position (L) or travel from the position just before any portion of the two circular cylinders telescope together or become radially adjacent to one another is:

$$C_{Cylinder} = \frac{2\pi \times Eo \times Er}{Ln \frac{r_2}{r_1}}$$

Ln = natural logarithem or Napieriau where
- Eo = the dielectric constant of free space
- Er = the relative dielectric constant of the oil in the damper
- Ln = natural logarithm or Napierian
- $r_2$ = radius of the bore of the piston rod
- $r_1$ = outer radius of the hollow cylinder secured to the cylinder base
- $\pi$ = 3.14159

This equation follows from the fact that the movable circular piston rod is displaced from and concentrically disposed over the inner hollow circular cylinder which inner cylinder is secured in an insulating manner to the base of the outer, vibration damper cylinder. This results in a variation of the cylinder surfaces being radially adjacent to one another and results in the variation of the capacitance in accordance with the travel or position of the piston. The electrodes are formed by the structure, such that, one electrode on the one hand is formed by the hollow piston rod and the other electrode on the other hand is formed by the tube fixed to the base of the cylinder.

According to an alternative capacitive embodiment, it is provided that the base of the cylinder is arranged to be insulated from the cylinder to form the second electrode and the first electrode is formed by that face of the piston which faces towards the base of the cylinder.

Also, in this alternative embodiment, the capacitor is formed by the components of the assembly itself provided to form the suspension which includes the vibrational damper of which the capacitor is a part. Here the change in capacitance is produced by the varying spacing or distance between the two electrodes which capacitance is expressed by the equation:

$$C = \frac{E_o \times E_r \times A}{L}$$

where,
- $E_o$ = dielectric constant of free space
- $E_r$ = relative dielectric constant of oil dielectric or in the vibrational damper
- A = effective surface area of the electrodes (faces of piston and base of cylinder)
- C = capacitance
- L = distance between the electrodes By calculating the capacitance for two different positions of the piston, this equation shows that a change in the spacing, between the piston and the cylinder base, produces a change in the capacitance by which the corresponding position change or travel can be derived.

To produce a corresponding electric signal, which can be used, for example, for controlling the height of a vehicle, it is provided according to a yet further embodiment that the electrodes of the capacitor are connected in a capacitance measuring bridge and produce an electric signal corresponding to position. This signal is fed through an amplifier for use in making adjustments to the pressure of the damping medium, thereby changing the position of the piston to a desired position.

It is a further aim to arrange such a device so that, in addition to the evaluation of the variable capacitance, a simultaneous compensation for pressure and temperature is made possible such that the pressure is regulated by the position and/or change and/or rate of change of position of the piston in operation.

To solve this problem, it is provided in a yet further and third, capacitive embodiment of the invention that, within the cylindrical interior of the inner, first tube, forming an electrode, is secured in the base of the vibrational damper cylinder, there is arranged and spaced from it, a further second inner fixed tube which forms an additional electrode defining, with the first tube, a second capacitor having a fixed capacitance value under conditions of a fixed temperature and a fixed pressure.

An advantage of this third embodiment is that by the insulated incorporation of an additional, second, metallic, circular cylinder, as a further third electrode within the electrode already present on the base of the vibrational damper cylinder, a second capacitor having a fixed capacitance under specific condition is produced. This gives the advantage of a capacitance half-bridge which is made up of the variable capacitance (varied by displacement of the piston rod) and the fixed capacitance secured in the base of the cylinder which fixed, second capacitor varies in capacitance in the same way that the variable first capacitor varies from influences other than displacement of the piston and/or piston rod.

This arrangement in the third capacitive embodiment not only allows improved evaluation of the variable capacitance but also achieves a simultaneous compensation for at least pressure and temperature in that, by means of a suitable electronic circuit, e.g. a Wheatstone Bridge, the ratio of the two capacitances is taken into account.

In one embodiment of the invention, it is provided that the first tube and the further, second tube are arranged to be insulated from one another. The further, second tube can likewise be secured in the base of the cylinder.

In an alternative, magnetic or inductive, embodiment of the invention, it is provided for solving the problem posed according to the invention that the outer surface of the cylinder has, over at least a portion of the region of the piston travel, at least one winding producing a magnetic field.

It is advantageous that an inductive or magnetic field should be produced. The piston and piston rod of the vibration damper, being disposed in this magnetic field, produces an increase in the inductance as the piston and piston rod move further into the damper cylinder so that after measuring and converting the inductance into an electrical magnitude the determination of the piston position and thus travel can likewise be obtained. Also this embodiment is suitable for the output signal to be able to be used as a basis for, for example, vehicle height control.

A further, inductive embodiment of the invention envisages that two windings are provided, having longitudinal axes which are substantially coextensive with the longitudinal axis of the cylinder of the vibration damper. Each of the windings covers preferably the distance of half the piston travel. In these versions it is advantageous that the piston rod can be made solid and not necessarily hollow. Ferromagnetic materials with relatively high permeance are advantageously used for making at least portions of the piston and/or the piston rod.

By such an arrangement of the windings, two inductances are formed which can be used directly as the series components of one side of an inductance measuring bridge.

BRIEF DESCRIPTION OF THE DRAWINGS

Preferred embodiments of the invention by way of example are illustrated diagrammatically in the drawings.

DESCRIPTION OF THE PREFERRED EMBODIMENTS

Figure 1:
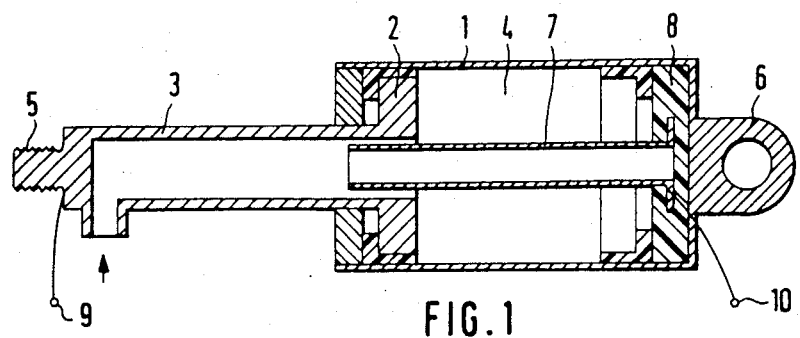
FIG. 1 shows a sectional view of a vibration damper, in which the hollow piston rod forms a capacitor in conjunction with a tube in a cavity of the damper.

The vibration damper illustrated in FIG. 1 comprises substantially a cylinder 1, a piston 2 and a piston rod 3, well known in the prior art. In the interior 4 of the cylinder 1 there is at least one damping medium serving for damping vibrations of the piston 2. Attachment means 5 and 6, well known in the prior art, are provided for mounting the vibration damper in a vehicle. The piston rod 3, which is made hollow, slides telescopically over a tube 7, the tube 7 being located in the cylinder, and attached thereto by an insulating body 8 which insulate the tube 7 from the remainder of the components of the damper. The hollow piston rod 3 and the tube 7 form together the circular cylindrical capacitor. The damping medium present in the cavity 4 forms a dielectric for the capacitor. The hollow piston rod 3 forms the first electrode and is connected through a lead 10 connected through an insulating terminal (not shown) to appropriate terminals of an appropriate measurement-device. The piston rod 3 forms a second electrode which is connected through a lead 9 to appropriate terminals of the measurement device.

The steepness of the change in capacity is dependent upon the spacing between the outer surface of the tube 7 and the inner surface of the hollow piston rod 3, and on the medium present between them. The hollow piston rod 3 is arranged coaxial and is concentrically spaced from the tube 7 and a space between them receives the dielectric which may be a damping medium such as oil, or even a dielectric solid between the facing surfaces of the tube 7 and the piston rod 3.

Figure 2:
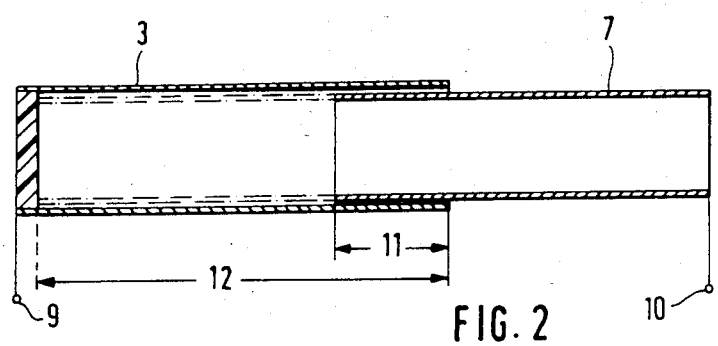
FIG. 2 shows a sectional view of a diagrammatic representation of a cylindrical capacitor.
Figure 8:
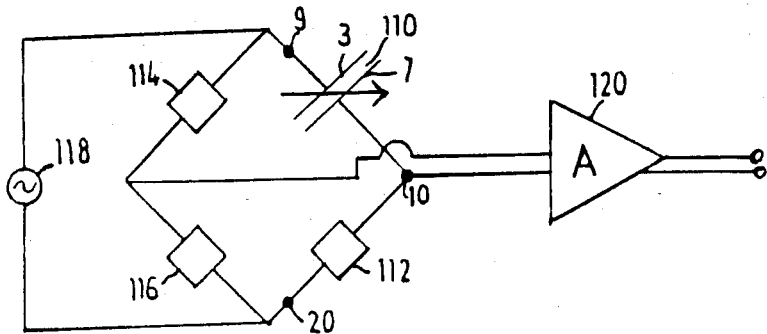
FIG. 8 shows schematically the embodiments of FIGS. 1 and 7 arranged in an impedance measuring bridge.

In FIG. 2, there is diagrammatically illustrated a cylindrical capacitor, the first electrode comprising the hollow piston rod 3 and the second electrode tube 7. The spacing 11 indicates a practical minimum overlap. The spacing 12 indicates the maximum overlap between the two surfaces when the piston 2 is as far to the right in FIG. 1 is it can move. These overlaps produce a minimum and maximum capacitance when appropriately converted, represent the minimum and maximum travel position of the piston. By interpolating between these extrema, the position of the piston in the cylinder is indicated by a capacitance thereinbetween. The leads 9 and 10 serve, for example, for connection to a capacitative measuring bridge as shown in FIG. 8 infra.

Figure 3:
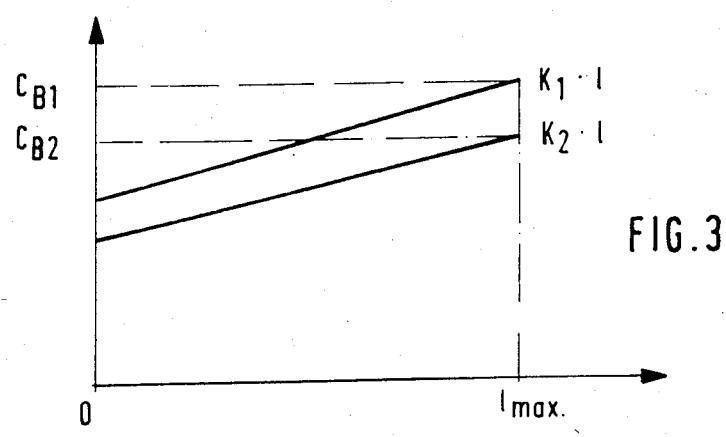
FIG. 3 shows a diagram of capacitance of the cylindrical capacitor of FIG. 2 with respect to piston position or a piston travel.

FIG. 3 shows a diagram in which the capacitance of such a cylindrical capacitor is plotted against piston position or travel. FIG. 3 also shows that the change in capacitance is proportional to the travel of the piston and the steepness of the curve is dependent on the ratio of the inside radius of the bore in the piston rod to the outside radius of the tube 7, and the relative dielectric constant $E_R$. The relative dielectric constant $E_R$ is predetermined in a preferred embodiment by the damping medium used. The two solid straight lines show two different cylindrical capacitor arrangements having, for example, different maximum overlaps spacings between the piston rod 3 and the cylinder, or relative dielectric constants $E_R$ of the dielectric.

Figure 4:
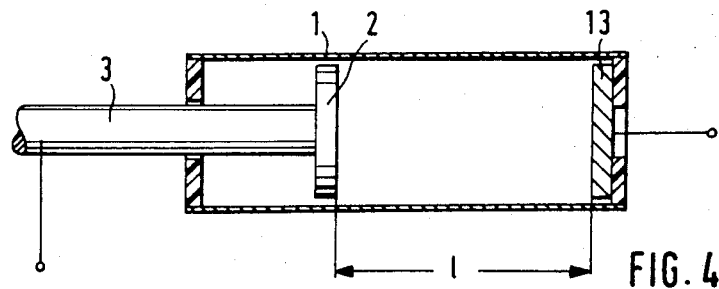
FIG. 4 shows a sectional view of a further embodiment of a vibration damper, in which the face of the piston and the base of the cylinder form plates of a capacitor.

FIG. 4 shows diagrammatically an alternative, second capacitive embodiment of the invention a vibration damper again having a cylinder 1, a piston 2 and a piston rod 3. The piston 2 and the base 13 of the cylinder form the first and second electrodes of a capacitor. The base 13 of the cylinder 1 is mounted in this cylinder 1 but insulating therefrom so that a desired change in capacitance can be obtained from the varying distance between the piston 2 and the base 13 of the cylinder 1. By appropriate conversion of the measured value, likewise in this embodiment, the position of the piston can be obtained.

Figure 5:
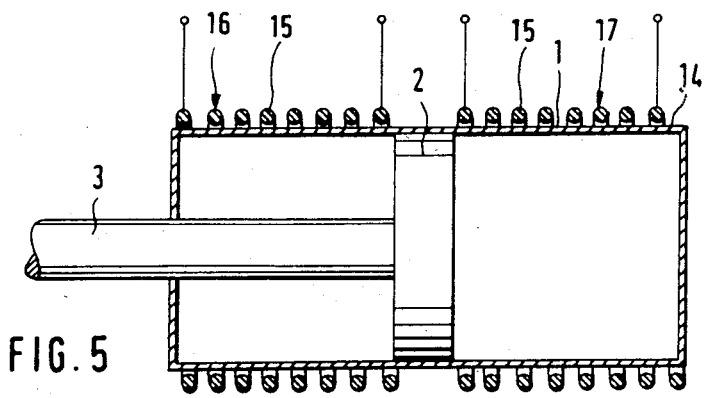
FIG. 5 shows sectional view of a vibration damper wherein an inductive coil is disposed on the surface of the cylinder.

As an alternative, inductive embodiment, there is shown in section in FIG. 5, a vibration damper of which again the principal components are the cylinder 1, the piston 2 and the piston rod 3.

The outer surface 14 of the vibration damper cylinder 1 is provided with windings 15, comprising a first coil 16 and a second coil 17 being formed for respective generation of a magnetic field. The coils 16 and 17 when connected appropriately as the arms of a half-bridge generate a positional signal indicative of the position of the piston 2.

The resultant inductive half-bridge generates a bridge voltage determined by the degree or position of the insertion of the piston 2 in the damper cylinder, so that, a suitable signal corresponding to the piston travel is available.

Figure 6:
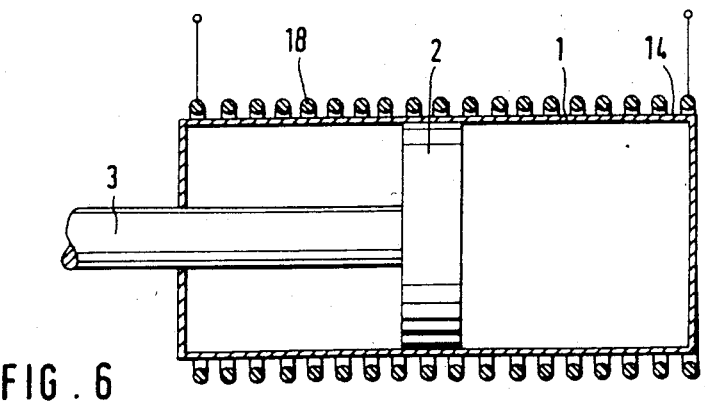
FIG. 6 shows a sectional view of a vibration damper with another coil arrangement.

FIG. 6 shows a further, second inductive embodiment. The principal components of a vibration damper are here again the cylinder 1, the piston 2 and the piston rod 3, which in the embodiments using inductance, does not have to be made hollow. A winding is applied to the outer surface of the vibration damper cylinder 1 extending preferably over at least the entire range of travel of the piston. On insertion of the piston within this region, there is a resulting change in inductance which can be correspondingly evaluated. The piston rod 3, at least, in FIGS. 5 and 6, is preferably made of a ferromagnetic material in order to vary the inductance as much as possible from one position of the piston 2 and piston rod 3 to another position thereof.

Figure 7:
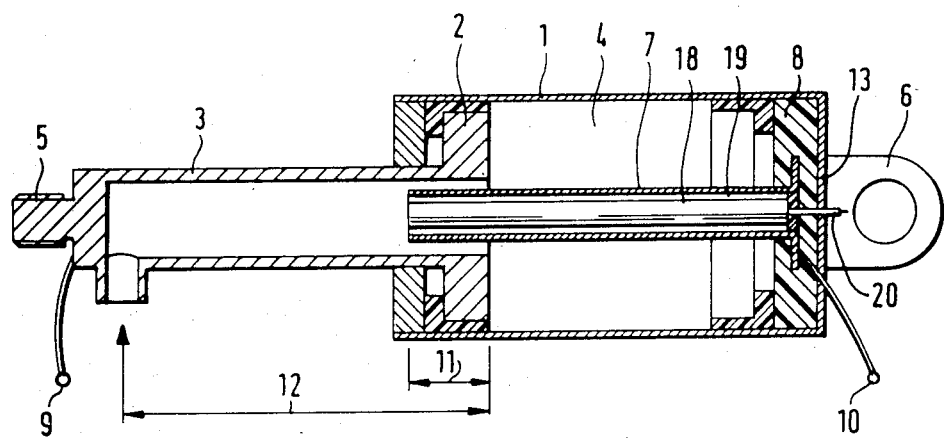
FIG. 7 shows a sectional view of a vibration damper in which the tube forms, with a further cylindrical tube, a second fixed capacitor.

The vibration damper illustrated in FIG. 7 comprises a yet further, fourth capacitance embodiment of the invention which is made up of basically the cylinder 1, the piston 2 and the piston rod 3 as in FIG. 1. Within the interior 4 of the cylinder 1 there is the damping medium serving for damping vibrations. As in the embodiment of FIG. 1, mounting means 5 and 6 are provided for mounting the damper in the vehicle in a manner well known in the prior art. The piston rod 3, which is made hollow, can slide telescopically over the tube 7, the tube 7 being secured in the cylinder in an insulating body 8 and being insulated with respect to the remainder of the components of the damper. The hollow piston rod 3 and the tube 1 form together the cylindrical capacitor. The damping medium present in the space 4 preferably forms the dielectric for the capacitor as in FIG. 1. The hollow piston rod 3 forms the first electrode and the tube 7 forms the second fixed electrode and is connected through the lead 10, passing through an insulated terminal arrangement (not shown), to the input of an appropriate measurement device such as shown in FIG. 8 infra.

The steepness of the change in capacity is dependent upon the spacing between the outer surface of the tube 7 and the inner surface of the hollow piston rod 3 and on the dielectric medium present between them. The hollow piston rod is arranged coaxial and spaced from the tube 7 and the space between them receives the dielectric.

The spacing 11 represents the minimum overlap and the spacing 12 the maximum overlap between the two surfaces, producing accordingly a minimum and a maximum capacitance, which, appropriately converted, indicate the momentary piston travel, i.e. the position of the piston in the cylinder.

Secured within the cylindrical interior 19 of the tube 7 is a further tube 18 which is likewise arranged spaced from the tube 7. Between the two tubes, the damping fluid again here acts preferably as a dielectric as in FIG. 1, the dielectric may be solid. By the fixed arrangement of the two tubes 7 and 18 with respect to one another there is produced a capacitor having a fixed capacitance at a particular temperature and pressure. The cylindrical tube 18 which acts as the further electrode is mounted in the base 8 of the cylinder again in an insulated manner and is connected to the measurement receiver through a lead 20. The tube 7 and the tube 18 again form a tubular circular capacitor which serves for compensating for at least the pressure and temperature of the dielectric medium between the tube 7 and the piston rod 3. The manner of operation of the overall system is well known in the prior art of Wheatstone Bridge as a capacitive half-bridge.

In FIG. 8, a schematic diagram is shown representing a bridge circuit 108, e.g., an impedance Wheatstone Bridge, for sensing the changes in capacitance of a variable capacitor 110 formed by the tube 7 and the hollow piston rod 3. The leads 9 and 10 are connected in the bridge 108 so that the capacitor 110 forms half on one arm of the bridge 108. Either a fixed capacitor external to the vibration damper or temperature variable capacitor, as shown in FIG. 7, and formed by the tube 7 and the tube 18, comprises a capacitor 112 forming the other half of the bridge 108 connected to the capacitor 110. Two other impedative elements, preferably capacitors 114 and 116 form the other half of the bridge 108. Series capacitors 110 and 112 form one arm and the series capacitor 114 form the other arm of the bridge 108. A generator 118, preferably supplying alternating current, is connected across the bridge 108 at the connectors between the capacitors 110 and 114 and the capacitors 112 and 116. The operation of a Wheatstone Bridge is well known in the electrical prior art.

It is within the purview of the invention that this generator 118 may also be a generator of direct voltage if the impedance levels of the bridge 108 are appropriate therefore. Also, within the purview of the invention, a pulsed generator may also be used under special circumstances. The terminal 10 forms one input of an amplifier 120 and a junction of the capacitors 114 and 116 forms the other input of the amplifier 120 which generates a signal proportional to the position of the piston 2.

Figure 9:
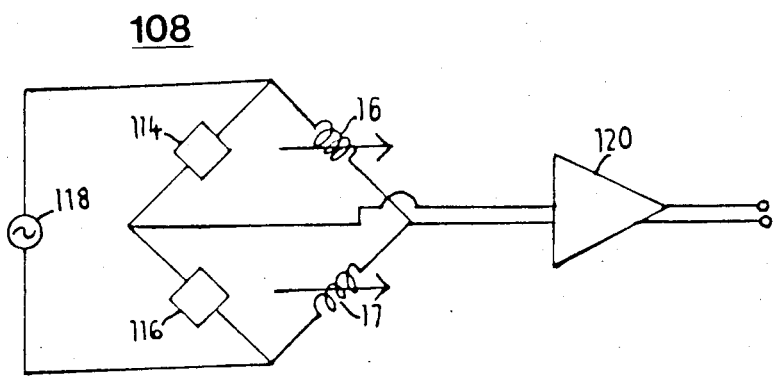
FIG. 9 shows schematically the inductive coil arrangement of FIG. 5 connected into an impedance measuring bridge.

In the case of the inductive coil embodiment of the invention as shown in FIG. 5 being adapted to the circuit in FIG. 8, the first coil 16 replaces the capacitor 110 and the second coil 17 replaces the capacitor 112 as in shown in FIG. 9. The other capacitors 114 and 116 are preferably replaced by impedances However, other impedative elements may be used for 114 and 116 if their impedance is chosen appropriately in a manner which is well known in the impedance bridge art.

For example, if both the capacitive 110 and 112 in FIG. 8 both increase by the same percentage amount due to change in the mutual dielectric because of temperature, pressure, etc., the voltage at the terminal 10 will remain constant, as is well known in the art of electrical bridge measurements such as the Wheatstone Bridge.

Figure 10:
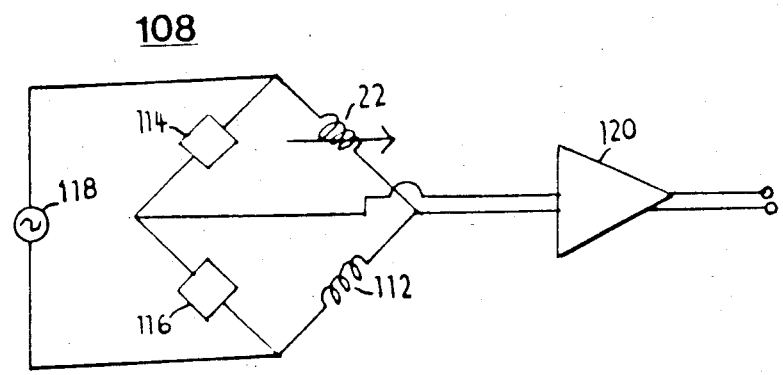
FIG. 10 shows schematically the coil arrangement of FIG. 6 connected into an impedance measuring bridge.

FIG. 10 shows the coil arrangement 22 of FIG. 6 connected into the bridge 108 replacing the component 110.

The invention, as described hereinabove in the context of a preferred embodiment, is not be taken as limited to all of the provided details thereof, since modifications and variations thereof may be made without departing from the spirit and scope of the invention.

What is claimed is:

1. A damping cylinder of a vibration damper, said damping cylinder having an arrangement for determining a position of piston means therewithin, said cylinder having a space therewithin with said piston means disposed in said space for axial slidable movement within said cylinder;
   at least one damping medium being disposed within said cylinder for damping said axial movement of said piston means with respect to said cylinder;
   said arrangement for determining the position of said piston means comprising:
   means for sensing a position of said piston means within said cylinder;
   said position sensing means having a first element and a second element;
   said first element of said position sensing means being disposed to be movable with said piston means;
   said second element of said position sensing means being disposed to be substantially stationary with respect to said cylinder;
   said first element and said second element being electrical insulated one from the other;
   said two elements forming a variable impedance component which is substantially electrically reactive;
   and wherein said variable reactive electrical impedance varies, in operation, with said position of said piston means in said cylinder;
   an electrical signal generated by at least one of said elements and being indicative of said position of said piston means; and
   electrical connecting means, connected to at least one of said elements, for sensing said electrical signal, indicative of said position of said piston means.

2. The damping cylinder of said vibration damper, said cylinder having an arrangement for determining a position of piston means therewithin, according to claim 1 wherein said first element comprises a first electrode and said second element comprises a second electrode of a capacitor; dielectric means disposed at least in part between said first and second electrodes of said capacitor; and said electrical connecting means being connected to said first electrode and to said second electrode.

3. The damping cylinder of said vibration damper, said cylinder having an arrangement for determining a position of piston means therewithin, according to claim 2 wherein said piston means includes a piston rod; said first electrode comprises at least a portion of said piston rod.

4. The damping cylinder of said vibration damper, said cylinder having an arrangement for determining a position of piston means therewithin, according to claim 3 wherein said piston rod has a hollow portion; said cylinder has a base at one end thereof; said second electrode comprises a first, cylindrical tube which is disposed on and extends from said base of said cylinder means into said space within said cylinder, said hollow portion of said piston rod having a longitudinal axis being substantially axially aligned with a longitudinal axis of said first tube; said first tube at least during operation extending, at least partially, into said hollow portion of said piston rod.

5. The damping cylinder of said vibration damper, said cylinder having an arrangement for determining a position of piston means therewithin, according to claim 4 wherein first tube is hollow and has disposed therein a second cylindrical tube secured to the base of said cylinder; said second tube being spaced from said first tube, and comprising an additional electrode which together with the first tube from a further capacitor, said first tube and said second tube being substantially stationary with respect to one another.

6. The damping cylinder of said vibration damper, said cylinder having an arrangement for determining a position of piston means therewithin, according to claim 5 wherein said first tube and said second tube have the same type of dielectric material therebetween as the dielectric material which is between said first tube and said hollow portion of said piston rod.

7. The damping cylinder of said vibration damper, said cylinder having an arrangement for determining a position of piston means therewithin, according to claim 6 wherein said second tube is also secured in the base of the damper cylinder.

8. The damping cylinder of said vibration damper, said cylinder having an arrangement for determining a position of piston means therewithin, according to claim 7, wherein said first tube is insulated from the base of the cylinder.

9. The damping cylinder of said vibration damper, said cylinder having an arrangement for determining a position of piston means therewithin, according to claim 3, including capacitance measuring circuity for connection to said capacitor; said capacitance measuring circuit comprising a capacitor bridge; said variable capacitor forming one of the arms of one half of said capacitor bridge; and an amplifier connected to said capacitor bridge for generating an electrical signal corresponding to the position of said piston in said damper cylinder.

10. The damping cylinder of said vibration damper, said cylinder having a arrangement for determining a position of piston means therewithin, according to claim 6 wherein said further capacitor provides at least a temperature compensating capacitor being connectable in a said capacitance measuring circuit.

11. The damping cylinder of said vibration damper, said cylinder having an arrangement for determining a position of piston means therewithin, according to claim 2 wherein said cylinder has a base and wherein said piston means has a face disposed towards said base, said base of said damper cylinder being insulated from the cylinder to form said second electrode of said capacitor; and said face of said piston means forming said first electrode of said capacitor.

12. The damping cylinder of said vibration damper, said cylinder having an arrangement for determining a position of piston means therewithin, according to claim 11 including an impedance bridge, connected to said connecting means, for generating an electrical signal indicative of a position of said piston means.

13. The damping cylinder of said vibration damper, said cylinder having an arrangement for determining a position of piston means therewithin, according to claim 1 including an impedance bridge, connected to said connecting means, for generating an electrical signal indicative of a position of said piston means.

14. The damping cylinder of said vibration damper, said cylinder having an arrangement for determining a position of piston means therewithin, according to claim wherein first element comprises at least a portion of said piston means, said second element comprises inductive means comprising at least one inductance coil dipsosed about said cylinder so that movement of said piston varies said inductance of said inductive means, and said electrical connecting means being electrically connected to said inductive means.

15. The damping cylinder of said vibration damper, said cylinder having an arrangement for determining a position of piston means therewithin, according to claim 14 wherein said inductive means comprises two inductance coils disposed on the outer surface of said cylinder, each of said coils covering a region corresponding to one half total travel of said piston means.

16. The damping cylinder of said vibration damper, said cylinder having an arrangement for determining a position of piston means therewithin, according to claim 15 including an impedance bridge, connected to said connecting means, for generating an electrical signal indicative of a position of said piston means.

17. The damping cylinder of said vibration damper, said cylinder having an arrangement for determining a position of piston means therewithin, according to claim 14 including an impedance bridge, connected to said connecting means, for generating an electrical signal indicative of a position of said piston means.

18. A damping cylinder of said vibration damper, said cylinder having an arrangement for determining a position of piston means therewithin, said cylinder having a space therewithin with said piston means disposed in said space for axial slidable movement within said cylinder;

at least one damping medium being disposed within said cylinder for damping said axial movement of said piston means with respect to said cylinder;

one of said at least one damping medium being hydraulic damping oil;

said arrangement for determining the position of said piston means comprising:

said piston means including a circular, hollow piston rod;

said cylinder having a base at one end thereof from which a hollow circular cylindrical, first tube extends into said space and also into said hollow piston in a telescopic relationship therewith, thereby forming, with a dielectric material, comprising said hydraulic damping oil, disposed between said first tube and said piston rod, a variable, first capacitor;

a longitudinal axis of said piston rod being substantially aligned with a longitudinal axis of said first tube;

said first tube being insulated from said cylinder and said hollow piston rod;

a first lead connected to said first tube; and second lead connected to said hollow piston rod.

19. The damping cylinder of said vibration damper, said cylinder having an arrangement for determining a position of piston means therewithin, according to claim 18 wherein first tube is hollow and has disposed therein a second cylindrical tube secured to the base of said cylinder and insulated from said first tube; said second tube being spaced from said first tube, and comprising an additional electrode which together with the first tube form a further capacitor, said first tube and said second tube being substantially stationary with respect to one another; and said first tube and said second tube having the same type of dielectric material thereinbetween as the dielectric material which is between said first tube said hollow portion of said piston rod.

20. A damping cylinder of vibration damper, said cylinder having an arrangement for determining a position of piston means therewithin, said cylinder having a space therewithin with said piston means disposed in said space for axial slidable movement within said cylinder;

at least one damping medium being disposed within said cylinder for damping said axial movement of said piston means with respect to said cylinder;

* * * * *

UNITED STATES PATENT AND TRADEMARK OFFICE
CERTIFICATE OF CORRECTION

PATENT NO. : 4,577,509

DATED : March 25, 1986

INVENTOR(S) : Bernd MOSER

It is certified that error appears in the above-identified patent and that said Letters Patent is hereby corrected as shown below:

In Claim 4, line 8 after "cylinder", delete "," and insert --;--.

In Claim 5, line 8 delete "from", and insert --form--.

In Claim 9, line 3 delete all text after "therewithin,".

Claim 20, line 1, after "of" insert --a --.

Claim 20, after line 8, add the following:

said arrangement for determining the position of said piston means comprising:

said piston means comprising a magnetic material;

inductive means comprising at least one induction coil disposed about said cylinder, so that, movement of said piston means varies at least one inductance of said inductive means; and electrical connecting means being electrically connected to said inductive means.

Signed and Sealed this

Fourteenth Day of August, 1990

Attest:

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,577,509
DATED : March 25, 1986
INVENTOR(S) : Bernd MOSER

It is certified that error appears in the above-identified patent and that said Letters Patent is hereby corrected as shown below:

In Claim 14, line 4, after the word "claim", insert --1--.

In Claim 14, line 4, after the word "wherein", insert --said--.

Signed and Sealed this

Thirtieth Day of October, 1990

Attest:

HARRY F. MANBECK, JR.

*Attesting Officer*  *Commissioner of Patents and Trademarks*